INVENTOR
ALBERT W. ZEMEK
BY Fidelman & Wolffe
ATTORNEYS

Jan. 14, 1969    A. W. ZEMEK    3,421,284
COMPONENT SEQUENCING AND TAPING MACHINE
Filed Dec. 20, 1965

INVENTOR
ALBERT W. ZEMEK

BY *Fidelman & Wolffe*
ATTORNEYS

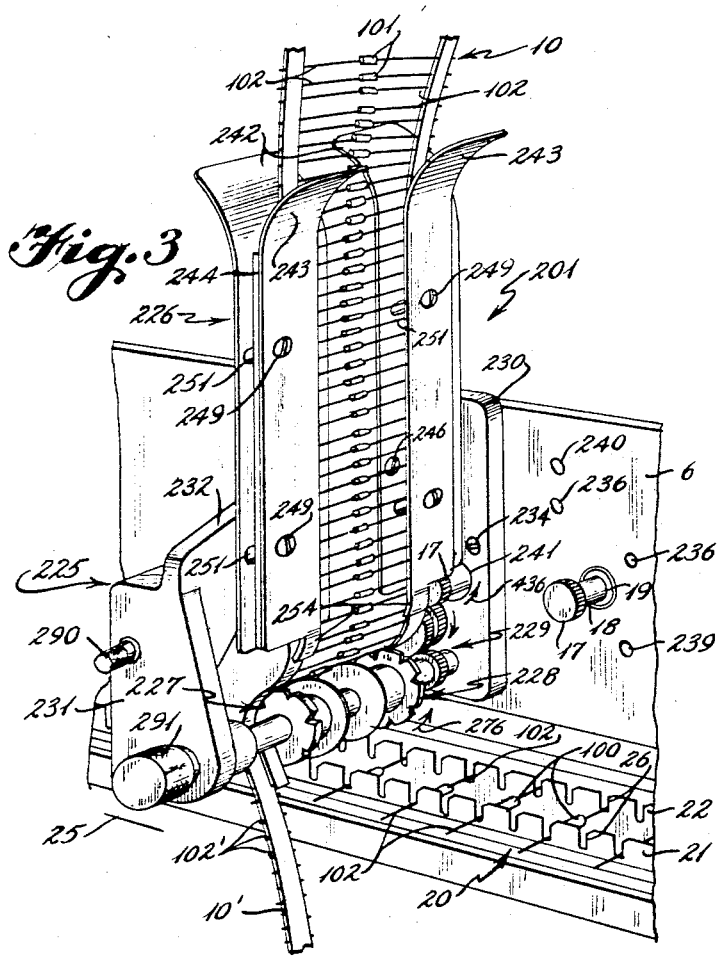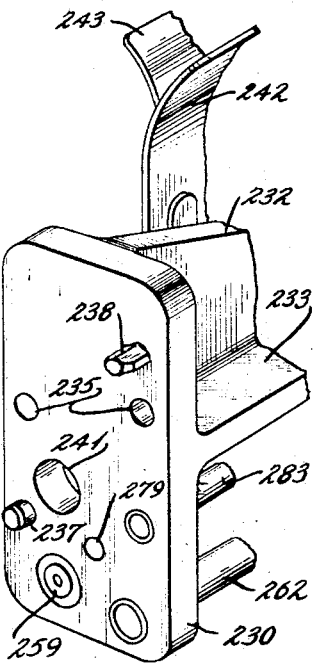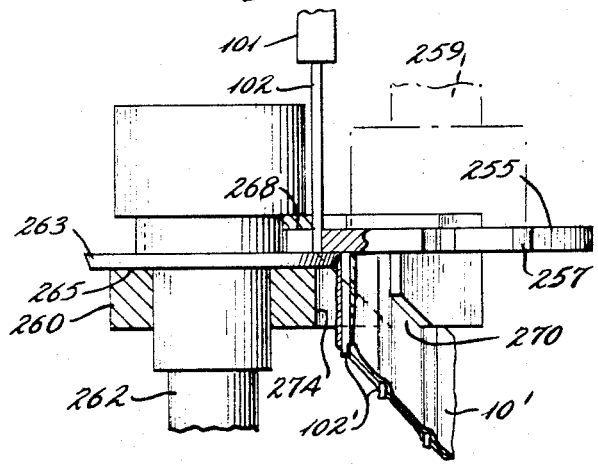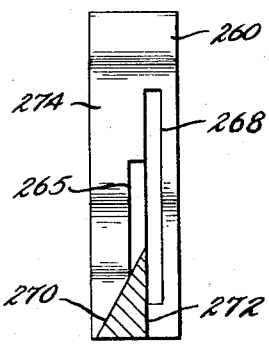

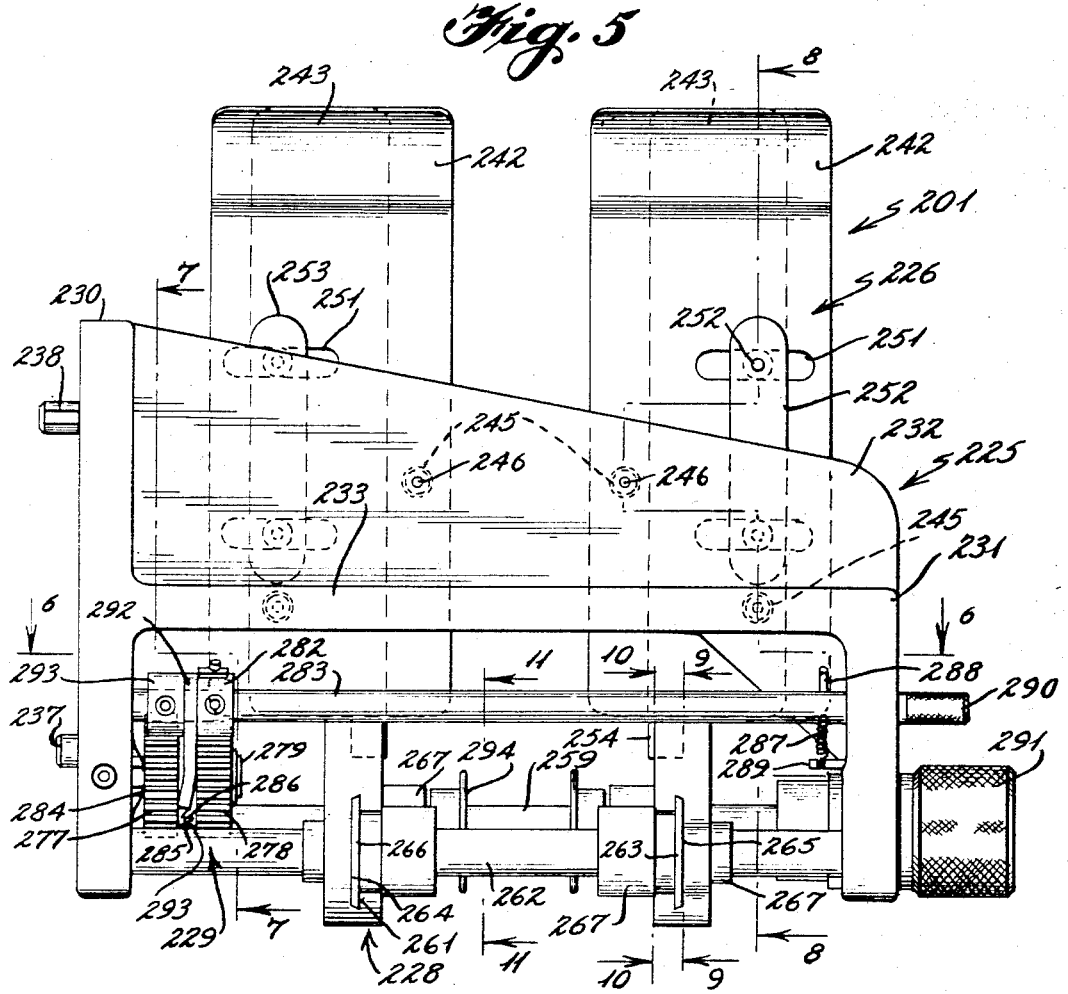
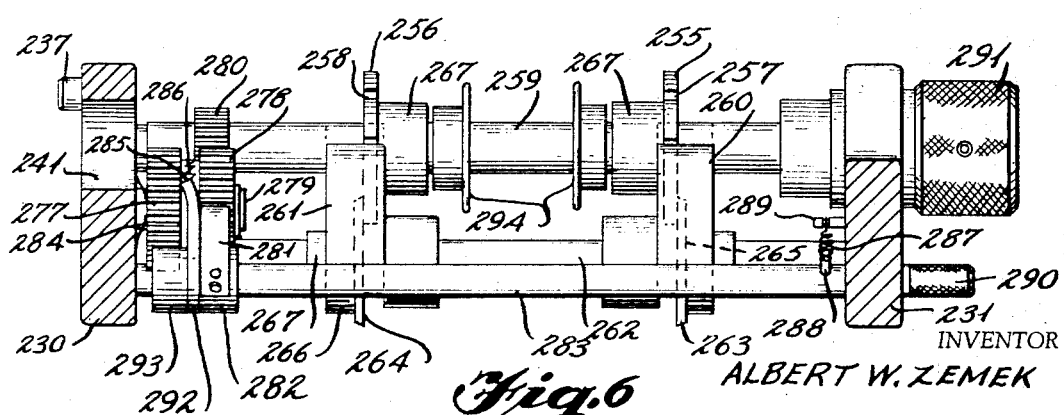

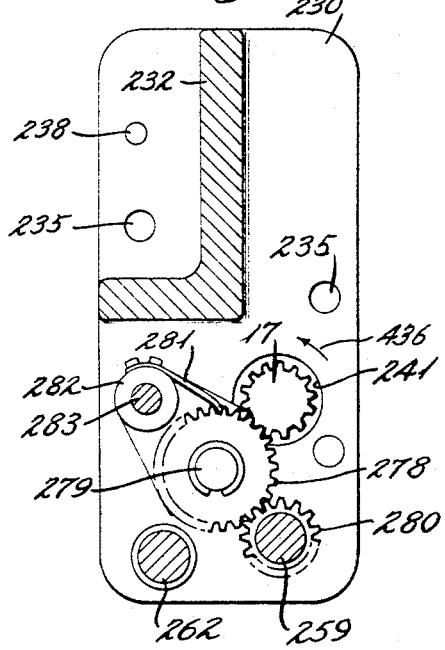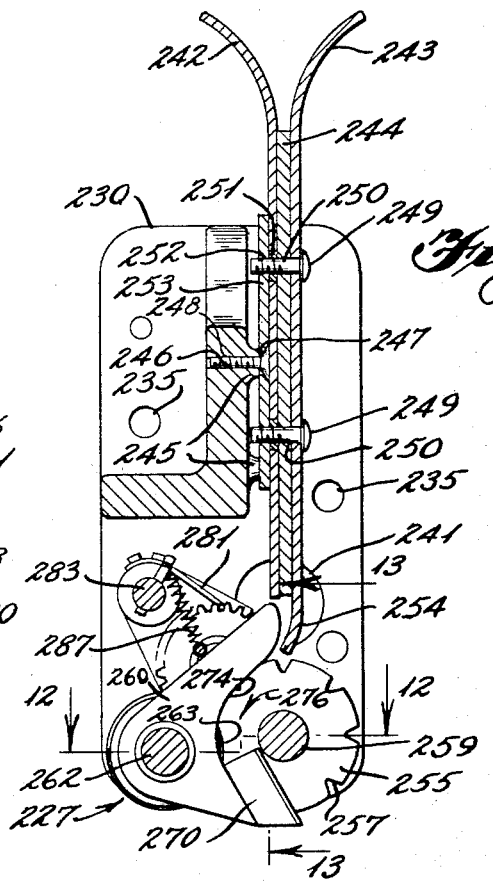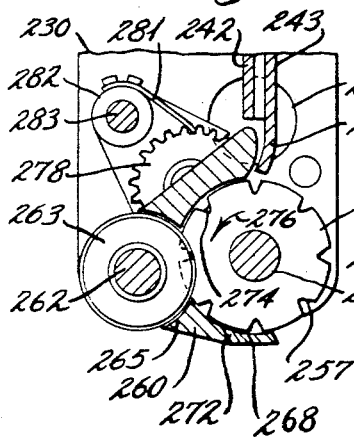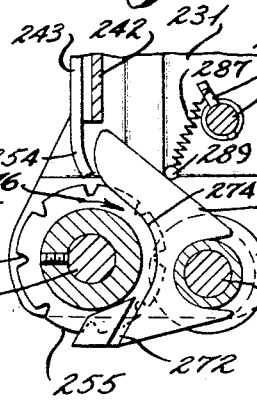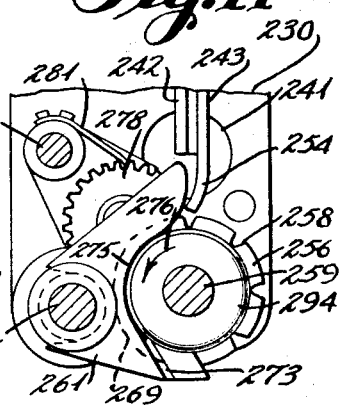
INVENTOR
ALBERT W. ZEMEK
BY Fidelman & Wolffe
ATTORNEYS

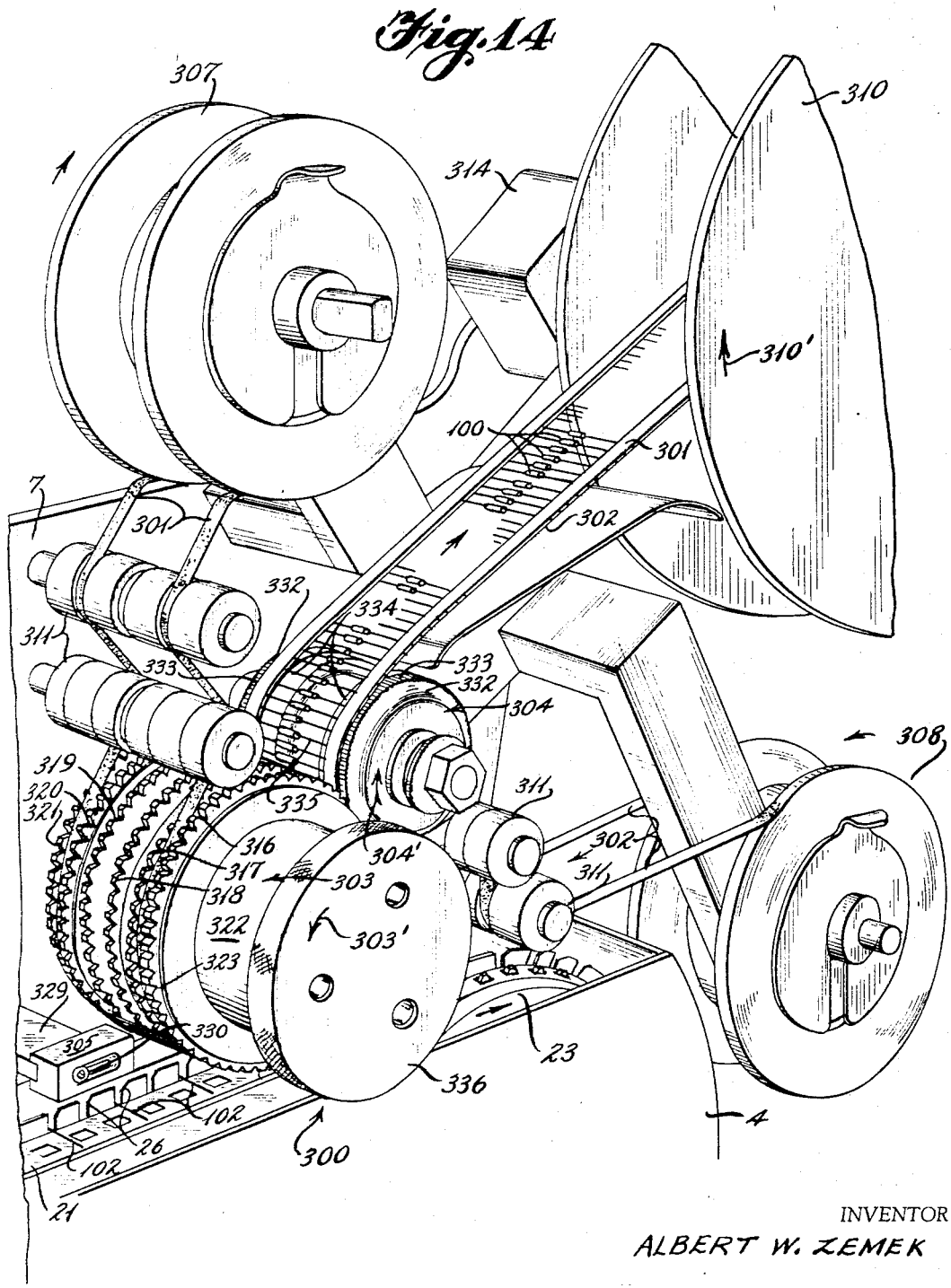

INVENTOR
ALBERT W. ZEMEK

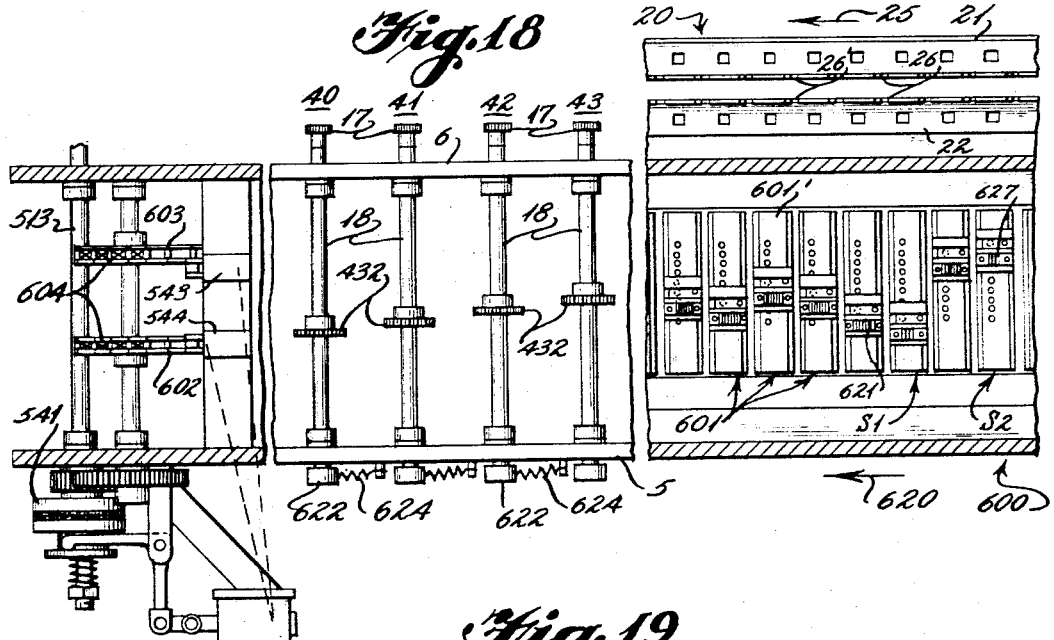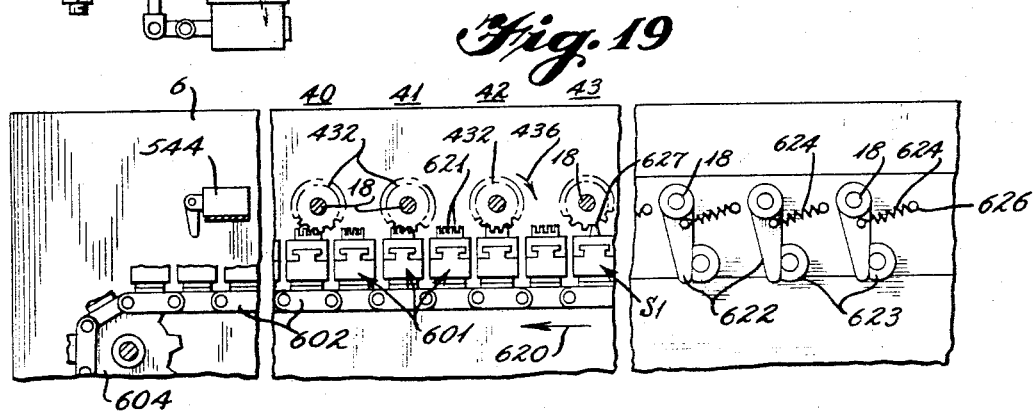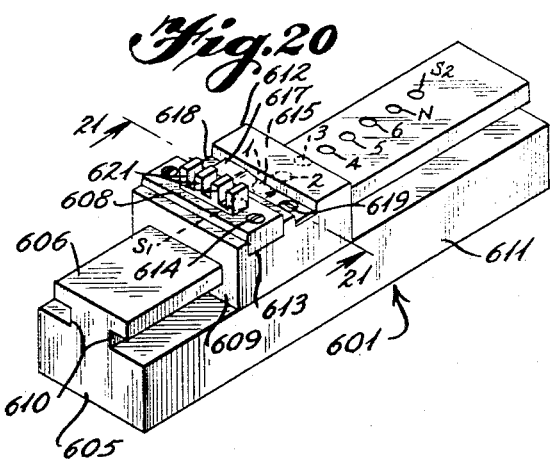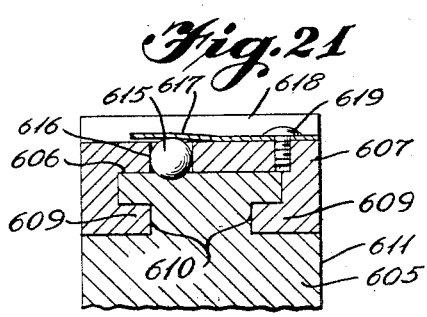

United States Patent Office 3,421,284
Patented Jan. 14, 1969

3,421,284
COMPONENT SEQUENCING AND TAPING MACHINE
Albert W. Zemek, Binghamton, N.Y., assignor to Universal Instruments Corporation, Binghamton, N.Y., a corporation of New York
Filed Dec. 20, 1965, Ser. No. 514,963
U.S. Cl. 53—59          20 Claims
Int. Cl. B65b 15/04; B65b 57/00

ABSTRACT OF THE DISCLOSURE

A component sequencing and taping machine for preparing programmed packages of taped components, including a plurality of component dispensers; an endless conveyor; means to control operation of the dispensers whereby components are deposited on the endless conveyor to form predetermined groups of components; and a taping mechanism adapted to remove and apply tape to the groups of components carried on the endless conveyor.

---

The present invention relates to an electrical component sequencing and taping machine. More particularly, the present invention relates to a machine for preparing programmed packages of taped components for use in printed circuit board component insertion machines.

It has become the practice in forming printed circuit boards to employ machines to automatically insert components into the boards in desired positions. Two types of automatic insertion machines now in use include those which are supplied by a plurality of separate magazines or taped component sources, the machine being programmed to select and remove desired components from each of the sources, and those which are supplied with a single pre-programmed component tape or single magazine source. The latter type of insertion machine, and in particular that which employs a single tape, is preferred because of its relatively simple construction and because the taped components are held under positive control thereby permitting high-speed component insertion. However, a disadvantage to the utilization of pre-programmed component tape machines is the unavailability of a satisfactory machine for forming the required component tapes.

It is therefore an object of the present invention to provide a machine for effecting high-speed tape packing of pre-programmed components.

A specific object of the present invention is to provide a machine adapted to successively deposit groups of programmed components onto a conveyor and to tape the groups of components directly from the conveyor.

A further object is to provide in a sequencing and taping machine an adjustable mechanical memory unit adapted to control operation of component dispensers so as to form successive groups of programmed components.

A still further object of the present invention is to provide in a sequencing and taping machine an adjustable mechanical memory unit adapted to control operation of both component dispensers and a component taping mechanism so as to form successive relatively spaced programmed groups of taped components.

It is a further object of the present invention to provide a component taping mechanism adapted to remove and apply tape to components carried on an endless conveyor.

It is also an object of the present invention to provide a dispenser adapted to trim the leads of taped axial lead components and to deposit trimmed components one at a time on an endless conveyor.

These and other objects together with a full understanding of the present invention may be had from reference to the accompanying specification and drawings, wherein;

FIG. 3 is a perspective view of the front of the component dispenser employed in the practice of the present invention;

FIG. 4 is a perspective view of the rear mounting flange of the component dispenser shown in FIG. 3;

FIG. 5 is a rear elevational view of the component dispenser;

FIG. 6 is a sectional view taken generally along the line 6—6 in FIG. 5;

FIG. 7 is a sectional view taken generally along the line 7—7 in FIG. 5;

FIG. 8 is a sectional view taken generally along the line 8—8 in FIG. 5;

FIG. 9 is a fragmentary sectional view taken generally along the line 9—9 in FIG. 5;

FIG. 10 is a fragmentary sectional view taken generally along the line 10—10 in FIG. 5;

FIG. 11 is a fragmentary sectional view taken generally along the line 11—11 in FIG. 5;

FIG. 12 is a fragmentary sectional view taken generally along the line 12—12 in FIG. 8 and illustrating the manner in which a component lead is trimmed from the component supply tapes;

FIG. 13 is a sectional view taken generally along the line 13—13 in FIG. 8 and illustrating the front surface of a dispenser cutter block;

FIG. 14 is a perspective view of the component taping mechanism of the present invention;

FIG. 18 is a fragmentary diagrammatic top plan view of the mechanical memory unit employed in the second embodiment of the present invention;

FIG. 19 is a fragmentary diagrammatic side elevational view of the mechanical memory unit;

FIG. 20 is a perspective view of a memory element employed in the memory unit; and FIG. 21 is a fragmentary sectional view taken generally along the line 21—21 in FIG. 20.

Figure 1:
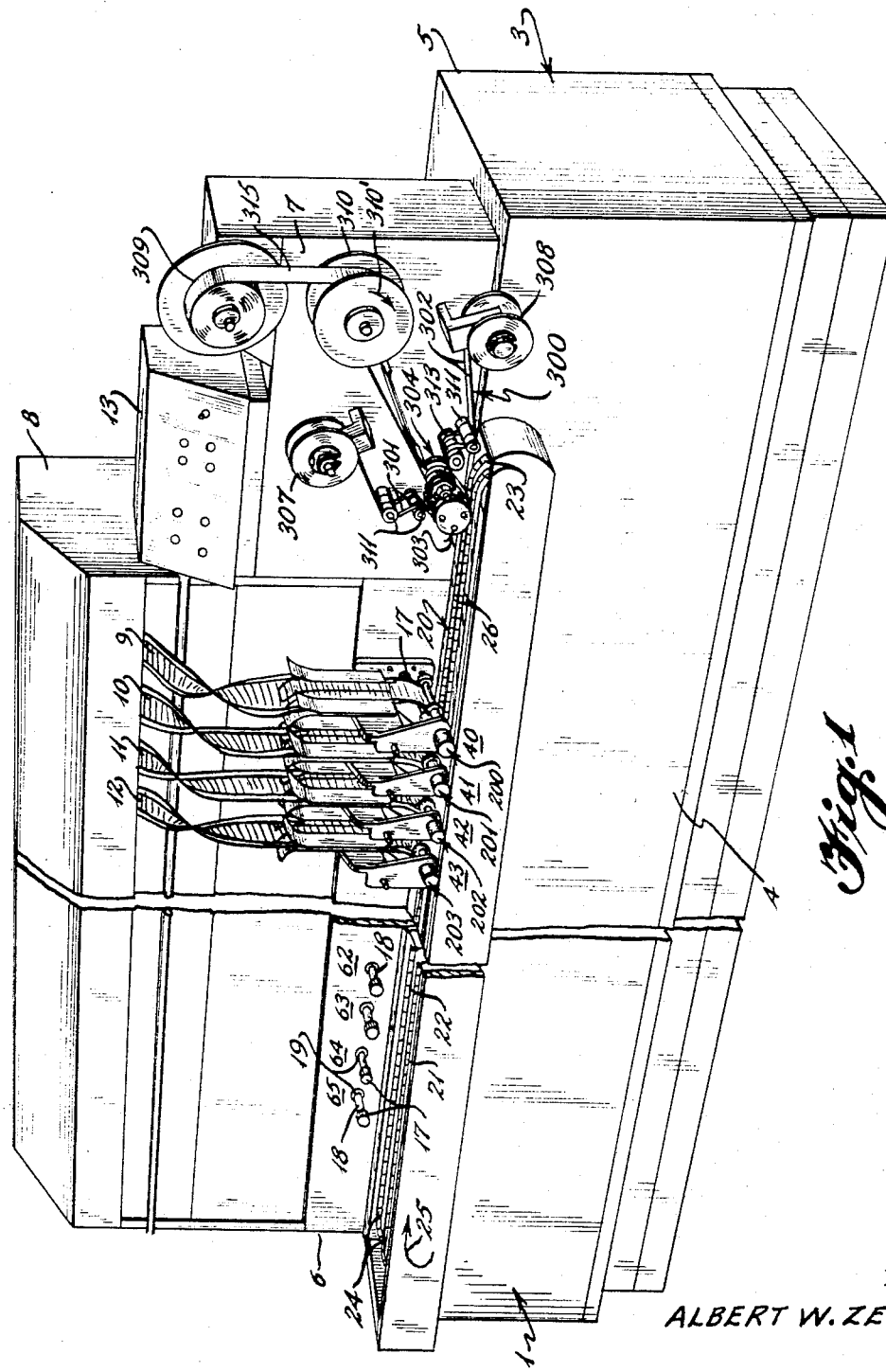
FIG. 1 is a perspective view of the front of the component sequencing and taping machine according to the present invention.

FIG. 1 is a perspective view of the front of the component sequencing and taping machine 1 of the present invention illustrating the relationship between a component conveyor, generally shown as 20; a plurality of dispenser stations, indicated as 40–65; a group of component dispensers, indicated as 200–203; and a taping mechanism, generally shown as 300. Machine 1 also includes a supporting base, generally shown at 3, having front and rear panels 4 and 5, a dispenser front mounting plate 6, a taping mechanism front mounting plate 7, a supply enclosure 8 adapted to support a plurality of component carrying supply tapes, such as 9, 10, 11, and 12, and a control console 13. As generally illustrated in the drawings, each of the dispenser stations 40–65 is provided with a dispenser actuating means which includes a dispenser drive gear 17 affixed to one end of a supporting shaft 18. Shaft 18 is journalled in suitable openings 19 provided in the front mounting plate 6 and rear panel 5, openings 19 being shown only in front plate 6.

For purposes of illustration, machine 1 is described as being employed to sequentially dispense and tape electrical components 100 of the tape having a body portion 101 and at least two leads 102 extending from one or both ends of body 101.

To insure a complete understanding of the component sequencing and taping machine of the present invention, it will be appreciated at the outset that two specific embodiments are disclosed; each such embodiment, if desired, being incorporated in a single machine and selectively employed.

Figure 2A:
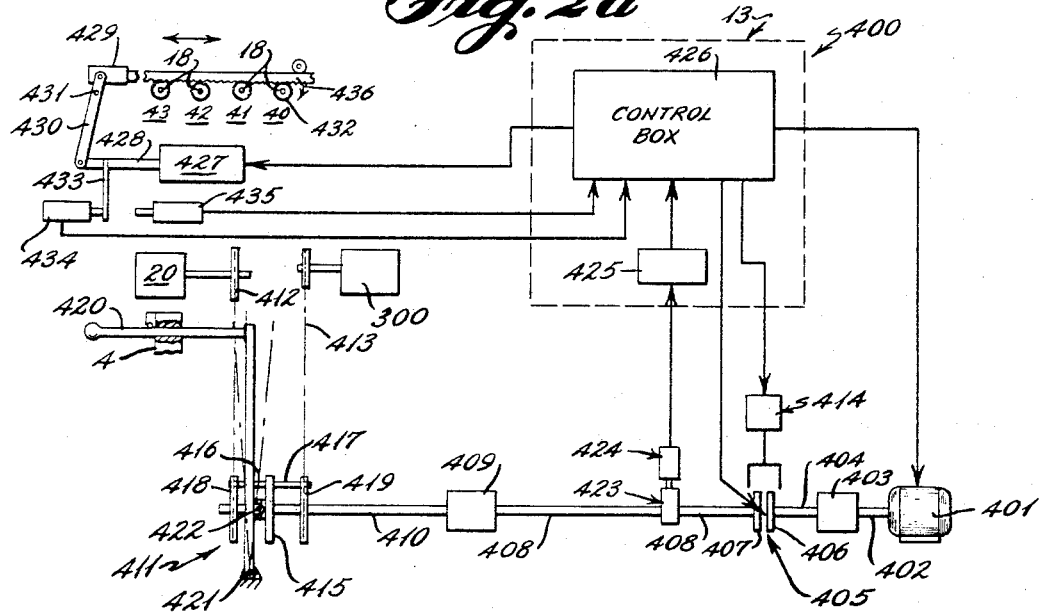
FIG. 2A is a diagrammatic view of the control means employed in the first embodiment of the present invention.

In the first and preferred embodiment, control means, generally indicated as 400 and more completely hereinafter described with reference to FIG. 2A, is employed to actuate all of the component dispensers, as for example dispensers 200–203, simultaneously to place a predetermined grouping of four components 100 onto conveyor 20; the conveyor 20 and the taping mechanism 300 being driven in a stop-start manner to receive and tape successive four component groups.

In the second embodiment, control means and a mechanical memory unit, which are generally indicated as 500 and 600 and are more completely hereinafter described with reference to FIGS. 2B and FIGS. 18 through 21, respectively, are employed to actuate the component dispenser, as for example 200–203, in a predetermined sequence to deposit successive groups of components on conveyor 20; the conveyor 20 and the taping mechanism 300 being continuously driven during the sequencing and taping operation.

Further, to facilitate understanding of the present invention, it will be appreciated that in designing the component sequencing and taping machine of the present invention, the maximum number of individual components needed to fabricate the most complex of a given series of circuits or portions thereof would be employed to determine the maximum number of dispenser stations to be provided on the machine, as for instance 40–65 as shown in FIG. 1. Thereafter, when it is desired to tape groups of components for less complete circuits, i.e., having fewer individual components, and the first embodiment of the machine is employed, an operator would merely remove component dispensers from the machine in excess of the desired number of individual components in the circuit. An operator would then supply the remaining dispensers, as for instance dispensers 200–203, shown in FIG. 1, in sequence with component tapes 9–12 which carry the types of components necessary to define the desired circuit group. Then to prepare the machine for operation, the operator would set the control means 400 to permit the conveyor 20 to be moved a predetermined distance between stops in the manner more clearly hereinafter discussed. Obviously, the dispensers at all of the dispenser stations could be left in place and only those necessary to define a desired group would be filled in sequence with the various types of components to be employed.

When it is desired to tape groups of components for less complex circuits, and the second embodiment of the machine is to be employed, an operator would select a number of dispensers, as for instance dispensers 200–203 shown in FIG. 1, corresponding to maximum number of dissimilar components to be employed in the circuit to be fabricated and then supply each of such dispensers with component tapes 9–12; the remaining dispensers either being removed from the machine, as illustrated in FIG. 1, or permitted to remain empty. Then, to prepare the machine for operation, an operator would modify the mechanical memory unit 600 to permit the dispensers 200–203 to be actuated in a desired sequence. As will hereinafter become apparent, by employing the second embodiment of the present invention any given machine may be adapted to tape groups of components having components in excess of the total number of dispenser stations in instances where one or more types of components in any tape group are to be repeated. Thus, a machine having a prescribed number of dispenser stations, can be adapted to form a taped group of components corresponding in number to the number of stations plus one for each repeated component.

COMPONENT CONVEYOR

Figure 16:
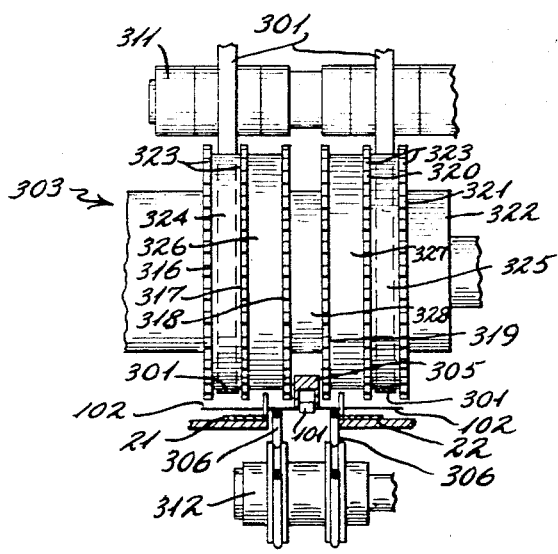
FIG. 16 is a sectional view taken generally along the line 16—16 in FIG. 15.

The component conveyor 20 employed in the practice of the present invention is preferably of the type described in U.S. Patent No. 3,138,239, assigned to the assignee of the present invention. Referring particularly to FIGS. 1, 3, and 16, conveyor 20 is shown as including a pair of spaced apart endless L-shaped belts 21, 22 which are trained about pairs of sprockets 23 and 24 which drive conveyor in the direction generally indicated by arrow 25. Belts 21, 22 are formed with spaced pairs of opposed slots 26 which are adapted to removably receive wire leads 102 of components 100.

CONTROLS

The control means 400 of the preferred embodiment of the present invention is illustrated in FIG. 2A. As shown, control means 400 includes a constant speed motor 401 having a drive shaft 402, which is employed to selectively drive conveyor 20 and taping mechanism 300 through a drive chain including a suitable speed reduction transmission 403; a continuously driven shaft 404; an electromagnetic clutch 405 having cooperating parts 406, 407; an intermittently driven shaft 408; suitable speed reduction transmission 409; a shaft 410; a selector drive assembly, generally shown as 411; and conveyor and taping mechanism drives, indicated generally as 412 and 413, respectively. As will be apparent from FIG. 2A, clutch part is associated with continuously driven shaft 404 and clutch part as supported for rotation with shaft 408.

For purposes of illustration, motor 401 is electrical and adapted to drive shaft 402 at 1750 r.p.m., and the gear reduction ratios of transmissions 403 and 409 are 15:1 and 25:1, respectively, to produce an output rotational speed for shaft 410 of about 4.67 r.p.m. Any suitable gearing arrangement, not specifically shown, may be employed for drives 412 and 413, and taping mechanism 300 may be driven at the same or at a greater speed than conveyor 20 depending upon the spacing desired between the components taped by the machine. The components of the drive chain are of known construction and individually form no part of the present invention.

For the purpose hereinafter discussed, means, such as a pneumatically driven reciprocating lock, generally shown as 414, is employed to positively position shaft 408 in a reference or starting rotational position each time clutch 405 is deenergized to separate clutch parts 406, 407. Positioning of shaft 408 may be effected by moving lock 414 into cooperating engagement with suitable pins or cam surfaces (not shown) provided on clutch part 407, or, if desired on shaft 408.

The selector drive assembly 411, includes a clutch disc 415 having a pair of drive pins 416 and 417 extending from opposed surfaces thereof, a conveyor drive gear 418 and a taping mechanism drive gear 419. It will be understood that clutch disc 415 is keyed for driven rotation with shaft 410 and that drive gears 418 and 419 are supported for rotation relative to shaft 410 and are provided with suitable openings, not shown, to removably receive drive pins 416 and 417.

As indicated in FIG. 2A, a manually operated handle 420, which is pivotably supported on machine 1 at 421 and pivotably connected to disc 415 at 422, may be employed to selectively slide clutch disc 415 axially of shaft 410 into one of the positions indicated as 1, 2, and 3. In the number 2 position of clutch disc 415, drive pins 416, 417 are received within the corresponding openings provided in both gears 418, 419, whereby the conveyor 20 and taping mechanism 300 may be simultaneously driven by shaft 410. When clutch disc 415 is shifted to the number 1 position, drive pin 417 is removed from driving engagement with taping mechanism drive gear 419, and when clutch disc 415 is shifted to the number 3 position drive pin 416 is removed from driving engagement with conveyor drive gear 418. This permits conveyor 20 and taping mechanism 300 to be simultaneously or independently operated. No difficulty is encountered in aligning and positioning drive pins 416, 417 within the corresponding holes provided in the drive gears 418, 419, since shaft 410 and disc 415 are directly geared for rotation with shaft 408 and clutch parts 406, 407.

As generally illustrated in FIG. 2A, a cam 423 is supported for rotation with shaft 408 and is adapted to actuate switch 424 once during each rotation of shaft 408. Switch 424 is employed to step a manually pre-set, automatically re-set, counter mechanism 425 of conventional construction, which is connected with an electrical and pneumatic control circuit, generally indicated as 426. The counter mechanism 425 and control circuit 426 may be housed within console 13, and the motor 401 and drive chain may be supported in any suitable manner with a machine base 3.

It will be understood that counter mechanism 425 may be selectively pre-set to be responsive to a predetermined number of revolutions of shaft 408, which corresponds to a predetermined distance of travel of a given pair of opposed conveyor slots 26 with respect to dispenser stations 40–65, and that counter-mechanism 425, acting through control circuit 426, is employed to deenergize clutch 405 each time shaft 408 is driven through a predetermined number of revolutions for which the counter mechanism 425 is set.

Referring again to FIG. 2A, it will be apparent that a group of dispensers disposed at dispenser stations 40–43, may be simultaneously operated by means of a pneumatic piston 427, which is controlled by circuits 426. As shown, piston 427 is provided with a reciprocating rod 428, which is connected to a reciprocating gear rack 429 by means of linkage 430 which is pivotably affixed to machine 1 at 431. Gear rack 429 operably engages a plurality of gears 432, which are suitably keyed for rotation with dispenser actuating gear shafts 18. Piston shaft 428 is provided with a projecting pin 433, which is adapted to trip switch 434 when the piston rod 428 is in extended position, as shown, and to trip switch 435 when piston rod 428 is in retracted position. Upon actuation of piston 427 to drive piston rod 428 to an extended position, gears 432 and thus dispenser drive gears 17 are partially rotated in the direction indicated by arrow 436 to operate the dispensers 200–203. When piston rod 428 is retracted gears 432 and drive gears 17 are counter-rotated to their initial or starting positions.

Assuming that 4-component groups are to be sequenced and taped by the first embodiment of machine 1, and that an operator has supplied dispensers 200–203 with suitable component tapes 9–12, has pre-set counter mechanism 425 to permit conveyor 20 to travel a distance sufficient to remove 4 pairs of conveyor slots 26, originally disposed in component receiving position below dispensers 200–203, from beneath such dispensers during operation of the conveyor between stops, and has placed the selector drive assembly in the number 2 position, it will be apparent that the operation of machine 1 is as follows. A suitable starter button, not shown, provided on console 13 is depressed to energize circuits 426 thereby operating motor 401 and energizing the clutch 405 to drivingly connect the conveyor 20 and taping mechanism 300 with motor driven shaft 404. Upon completion of a prescribed number of revolutions of shaft 408 and thus cam 423, counter mechanism 425 actuates the control circuits 426 which in turn deenergizes clutch 405 to stop conveyor 20 and taping mechanism 300. Reciprocating lock 414 is then actuated to position shaft 408 in its starting or reference rotational position. After a short time delay, circuits 426 actuate piston 427 to drive piston rod 428 towards its extended position to trip dispensers 200–203 simultaneously. Upon reaching its extended position piston rod 428 trips switch 434 to signal control circuits 426 to return the piston rod 428 to its retracted position, whereupon piston rod 428 trips return switch 435. Switch 435 is employed to indicate to the control circuits 426 that the dispensing operation has been completed, whereafter the control circuits 426 act to disengage lock 414 from clutch 405 and reenergize clutch 405 to once again drivingly connect conveyor 20 and taping mechanism 300 with continuously driven shaft 404. Suitable switch means, not shown, may be employed to disconnect or override counter mechanism 425 to permit selective operation of conveyor 20 or taping mechanism 300, as determined by the positioning of selector drive assembly 411, without actuation of pneumatic piston 427.

Figure 2B:
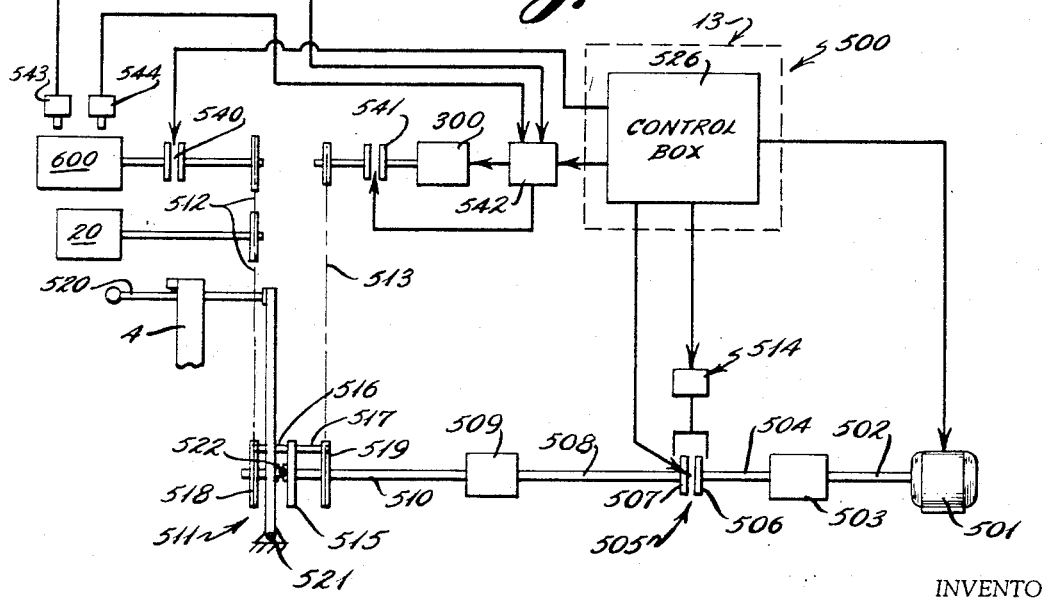
FIG. 2B is a diagrammatic view of the control means employed in the second embodiment of the present invention.

The control means 500 of the second embodiment of the present invention is illustrated in FIG. 2B. It will be apparent that a constant speed motor 501 having a drive shaft 502, is employed to selectively drive conveyor 20 and taping mechanism 300 through a drive chain which is identical to the drive chain discussed with reference to FIG. 2A. The drive chain is correspondingly numbered to indicate speed reduction transmissions 503, 509; clutch 505; selector drive assembly 511; and conveyor and taping drives 512 and 513, respectively. Also, as in the first embodiment, there is provided correspondingly numbered reciprocating lock 514 to insure the placement of shaft 508 in a desired reference or starting rotational position each time clutch 505 is deenergized.

A clutch 540, which is under the control of electrical and pneumatic control circuit of 526 is employed to selectively connect the mechanical memory unit 600 to conveyor drive 512. For the reasons hereinafter discussed, it will be noted that the mechanical memory unit 600, when connected to drive 512, is driven with conveyor 20 past dispenser stations 40–65 at the same linear speed.

Again referring to FIG. 2B, it will be seen that a clutch 541, which is employed to selectively connect the taping mechanism 300 with drive 513, is directly controlled by control circuits 526 through a suitable switching means, generally indicated as 542. Operation of clutch 541 is also controlled through switching means 542 by a pair of switches 543; 544, which are placed in operable proximity to mechanical memory unit 600, as specifically shown in FIGS. 18 and 19.

To illustrate operation of the second embodiment of machine 1, it will be assumed that 5-component groups are to be sequenced and taped and that two of the five components in each group are identical. As will become clear from the following discussion of the memory unit 600 with reference to FIG. 18, dispensers 200–203 may be supplied with component types A, B, C and D, respectively, and dispensers 200–203 actuated to place components on conveyor 20 in successive C, B, D, C, A groupings. For instance components A, B, C, D may be transistors, capacitors, 0.1 ohm resistances and 0.2 ohm resistances, respectively.

Thus, when a suitable starting button, not shown, on console 13 is depressed, the control circuits 526 and thus motor 501, clutch 540 and clutch 541 are energized. Clutch 505 is then energized to permit motor 501 to continuously drive conveyor 20, taping mechanism 300 and mechanical memory unit 600 to deposit and tape successive C, B, D, C, A, component groups; switches 543 and 544 being employed in certain instances hereinafter discussed to periodically deenergize clutch 541 to stop taping mechanism 300. It will be apparent that by means of clutches 540 and 541 and the selector drive assembly 511, the conveyor 20, taping mechanism 300 and mechanical memory unit 600 may be simultaneously or independently driven.

It will be appreciated that in the case where both embodiments of the present invention are to be employed in a single machine, each of the elements shown in FIGS. 2A and 2B are provided in the machine and selectively connected. For instance the control means 400 of the first embodiment may be converted to the control means 500 of the second embodiment, by merely disconnecting counter mechanism 425 from control circuits 426 and energizing clutch 540 to drivingly connect the mechanical memory unit 600 to conveyor drive 512, by suitable switch means, not shown, provided on console 13. Depending upon the specific design of the electrical and pneumatic control circuits 426, 526, pneumatic piston 427 may be rendered inoperative during practice of the second embodiment by suitable switch means, not shown, disposed on console 13, or may automatically be rendered inoperative by disconnecting counter 425.

MEMORY UNIT

Referring to FIGS. 18–21, the mechanical memory unit 600 is shown as including a plurality of memory elements 601, which are supported on and disposed transversely of an endless conveyor formed from a pair of spaced chain link bands 602, 603. Bands 602, 603 are trained about pairs of drive sprockets 604 (only one pair being shown in FIGS. 18 and 19).

Memory elements 601 are of identical construction and include generally an elongated base having on its upper surface 606 a plurality of longitudinally spacer circular recesses having markings $S_1$, 1, 2, 3, 4, 5, 6, N, $S_2$, respectively; a slide block 607, and a gear actuating rachet insert 608. An shown particularly in FIGS. 20 and 21, block 607 is provided with a pair of dependent leg portions 609 which are slidably received within longitudinal extending recesses 610 provided in the side wall 611 of base 605. The upper surface 612 of slide block 607 is slotted as at 613 to receive insert 608, which is removably affixed to blocks 607 by suitable means, such as screws 614. Slide block 607 is adustably positioned longitudinally of base 605 by means of ball detent 615 which is adapted to be received within one of the recesses $S_1$ through $S_2$. Ball detent 615 is carried within a circular bore opening 616 in block 607 and is biased downwardly into engagement with the upper surface 606 of base 605 by means of leaf spring 617, which is affixed within a slot recess 618 in block 607, by means of a screw 619.

As indicated in FIG. 18, the axial spacing between adjacent gears 432 is made to correspond to the spacing of rachet inserts 608 of successive memory elements 601, when such inserts are placed in numbered recesses 1, 2, 3, and 4, respectively. Conversion between the first and second embodiments of machine 1 may be effected by merely moving the gears 432, associated with dispenser stations 40–43 to be employed, out of operable engagement with the rachet bar 429 (not shown in FIGS. 18 and 19). Since, as mentioned above, dispensers are removed from the remaining dispenser stations 44–65 or the dispensers retained at such stations are not supplied with components, engagement of rachet bar 429 with gears 432 of the remaining stations has no effect on the operation of the second embodiment of machine 1.

Figure 15:
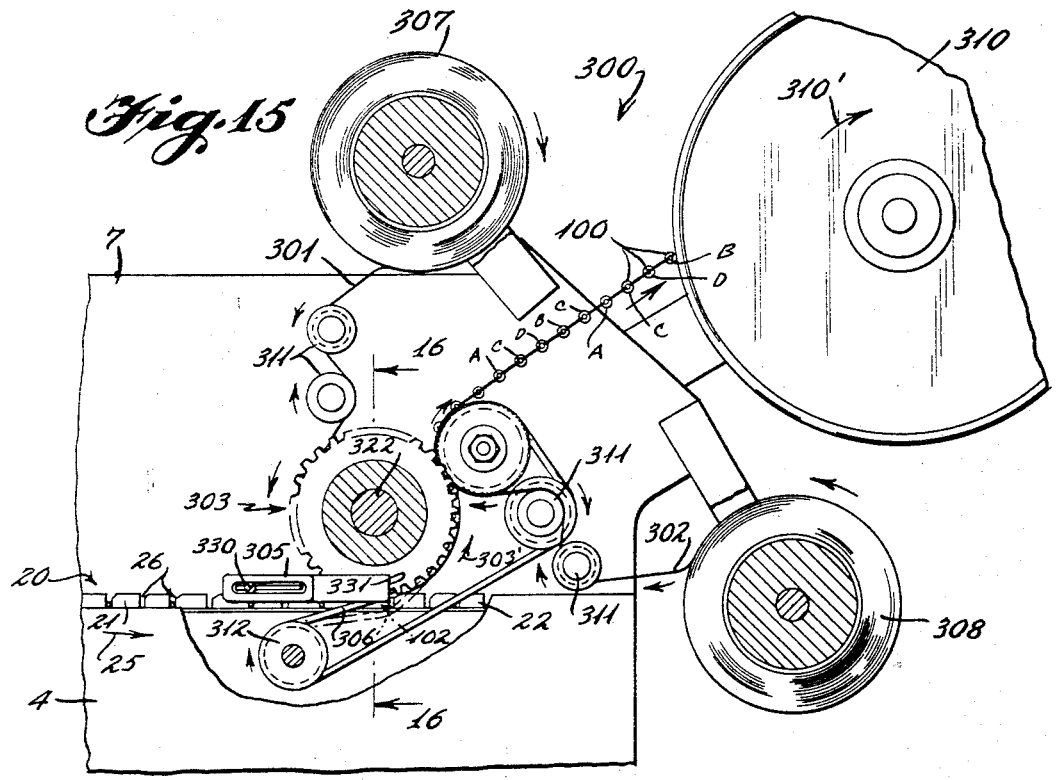
FIG. 15 is a fragmentary front elevational view of the component taping mechanism with the front cover of the machine removed to illustrate the manner of operation thereof.
Figure 17:
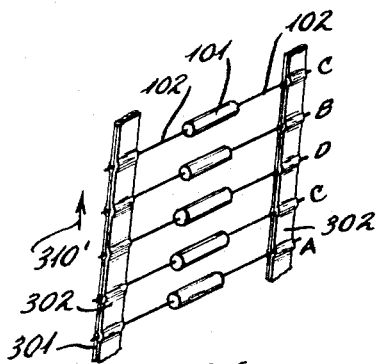
FIG. 17 is a perspective view of taped components passing from the taping mechanism.

To facilitate understanding of the operation of the mechanical memory unit 600, it will be assumed that 5-component groups are to be sequenced and taped by machine 1; that dispensers 200–203, disposed at stations 40–43, are provided with component types A, B, C, and D, respectively, and that it is desired to form taped groups each having in series C, B, D, C, and A type components. This component grouping is illustrated in FIGS. 15 and 17.

To achieve dispensing of the components in the desired C, B, D, C, A component grouping, an operator adjusts slide blocks 607 of the first five memory elements 601, as numbered from the left in FIG. 18, to position the ball detents 615 of the several slide block 607 in the numbered recesses 3, 2, 4, 3, and 1, respectively. It will be apparent that thereafter as the memory elements 601 are moved in the direction indicated by arrows 620 that the teeth 621 of the respective rachet inserts 608 will engage the gears 432 associated with stations 42, 41, 43, 42, and 40. Since, as indicated above, opposed slots 26 of conveyor 20 and elements 601 of the memory unit 600 are moved at the same linear speed past dispensers 200–203, it will be obvious that as a given memory element, such as 601; rotates gear 432 of dispenser station 43, a given pair of conveyor slots, such as slots 26; is positioned beneath dispenser 203 to receive a D-type component.

Referring again to FIGS. 18 and 19, it will be seen that the ends of shafts 18 which extend rearwardly through panel 5 are each provided with a return arm 622. Arms 622 are normally biased into engagement with resilient bumpers 623, affixed to panel 5, by springs 624. Springs 624 are affixed at their respective ends to pins 625, which are carried on arms 622, and pins 626, which are carried on panel 5. Thus it will be seen that as memory elements 601 move in the direction of arrow 620 the teeth 621 of rachet inserts 608 engage gears 432 to partially rotate shafts 18, drive gears 17 and return arms 622 in the direction indicated by arrow 436 to actuate the dispensers. After teeth 621 pass out of engagement with gears 432, springs 624 act to return drive gears 17 and arms 622 to their starting position; the resilient bumpers 623 acting to prevent clattering.

In constructing the mechanical memory unit 600 it is desirable to provide at least one memory element 601 for each of the dispenser stations to permit operation in cases where the circuit to be fabricated employs the full capacity of the machine and all components are dissimilar. Thus, a minimum of twenty-six memory elements 601 would be provided in the disclosed machine having stations 40–65 when the most complex circuit desired is one requiring twenty-six components each of which is dissimilar; each memory element 601 having a corresponding number of numbered recesses. It will be apparent that when the most complex circuit desired to be produced by a given twenty-six dispenser station machine is a forty component circuit, wherein twenty-six different types of components are to be employed, the minimum number of memory elements required to be provided will be increased from the above mentioned minimum to forty. Accordingly, it will be seen that the maximum number of dispenser stations required in a given machine corresponds to the maximum number of dissimilar components to be provided in the most complex circuit to be produced, and the maximum number of memory elements corresponds to the maximum number of individual components to be used in such circuit or a multiple thereof; provision being made, if desired, for spacing between component groups. The length of the chain link bands 602, 603 will, of course, be determined by the maximum number of memory elements to be provided in any given machine, since normally a memory element is provided on each of the pairs of spaced chain links of the bands.

It will be obvious that in a given machine having twenty-six memory elements and where less complex circuits are to be formed, as for instance four-component circuits, there will normally be a discontinuity, i.e. components missing, in the tapes produced, since the conveyor 20, taping mechanism 300 and memory unit 600 are adapted to be continuously driven, both the conveyor 20 and memory unit 600 travel at the same linear speed past the dispensers, and during each complete cycle or revolution of the memory unit only twenty four i.e. six four-component groups, of the twenty six memory elements are necessary. While a one-component spacing between groups is desirable, as will be discussed, it is obvious that when forming fourteen-component group, a twelve component spacing between groups is unacceptable for reasons of tape wastage and tape package reel size. Accordingly, we have provided means in the form of switches 543 and 544 which are adapted to control operation of taping mechanism clutch 541 in such a manner as to stop taping mechanism 300 during each cycle of memory unit 600 to prevent undesired discontinuities in the tapes produced.

Again referring to FIG. 18 it will be seen that switches 544 and 543 will be actuated by the rachet inserts 608 when the ball detents 615 of slide blocks 607 are received in the $S_1$ and $S_2$ number recesses respectively, of the memory elements 601. Thus, as the memory elements identified in FIG. 18 as $S_1$, $S_2$, move in the direction of arrow 620, switch 544 will be tripped by $S_1$ to disengage clutch 541 and switch 543 will be thereafter tripped by $S_2$; to re-engage clutch 541 to continue the taping operation. The rachet inserts 608 of memory elements $S_1$, $S_2$ of course do not engage any of gears 432. Suitable control means, not shown, may be provided to delay operation of clutch 541 to insure stoppage of taping mechanism only when no components are presented by conveyor 20, in cases where conveyor length between dispenser station 40 and the taping mechanism 300 exceeds that of memory unit 600. Also where it is desired to stop taping mechanism only momentarily to remove a discontinuity caused by only one missing component, one of the memory elements may be modified by providing a slide block, not shown, having a pair of ratchet inserts which are disposed adjacent the transverse ends of the block and relatively spaced apart in the direction of conveyor travel; the leading insert being adapted to actuate switch 544 and the trailing insert being adapted to actuate switch 543.

If desired, rachet inserts employed to actuate switches 543, 544 may have only one tooth 627, as shown in FIG. 19.

To both prevent actuation of switches 543, 544 and gears 432 by memory elements disposed between those identified as $S_1$, $S_2$, and to permit spacing between taped component groups, the memory elements are provided with recess N, which defines a neutral or non-operating position of slide blocks 607.

COMPONENT DISPENSER

Referring to FIG. 1 particularly, it will be seen that dispensers 200–203 are illustrated as being of identical construction and positioned at dispenser stations 40–43, respectively. It will be appreciated that dispensers 200–203 are individually controlled by drive gears 17, mounted one at each of the dispenser stations.

In that dispensers 200–203 are of like construction, only dispenser 201 will be described, specific attention being directed to FIGS. 3–13. Dispenser 201 includes an integrally cast dispenser body, generally indicated as 225, on which is supported a component supply tape guide assembly, generally indicated as 226, a pair of component lead feed and cutter mechanisms, generally shown as 227 and 228, and a feed and cutter mechanism drive assembly, generally shown as 229. Dispenser body 225 generally includes a pair of end plates 230 and 231, a vertically disposed tape guide assembly flange 232, and a horizontally extending reinforcing flange 233.

As generally indicated in FIGS. 3 and 4, end plate 230 may be removably affixed to machine front mounting plate 6 by means of a pair of screws 234 (only shown in FIG. 3) which are received within bore openings 235 provided in plate 230 and are threaded into openings 236 provided in front mounting plate 6. The positioning of dispenser 201 with respect to threaded openings 236 and drive gear 17 is facilitated by means of guide pins 237 and 238 which are carried on end plate 230 and adapted to be slidably received within suitable openings 239 and 240 provided in mounting plate 6. As will be apparent from the drawings, end plate 230 is also provided with an enlarged bore opening 241 through which drive gear 17 is adapted to project.

The component tape supply assembly 226 includes a pair of spaced rear guides 242, a pair of spaced front guides 243 and a pair of guide spacers 244 which are clamped between front and rear guides 242, 243. Together, the guides 242, 243 and inserts 244 act to form a component tape feed channel which may be adjusted to handle components having various lead lengths and thicknesses. The transverse spacing between the guide pairs 242, 243 permit variable size component bodies 101 to be dispensed.

As shown generally in FIGS. 5 and 8, tape supply assembly 226 is spaced from vertical flange 232 by means of four spacers 245, which are formed integrally with flange 232, and, as shown particularly in FIG. 8 are affixed to flange 232 by means of screws 246 which pass through openings 247 in rear guides 242 and are threadedly received within flange openings 248.

Front guides 243 and guide spacers 244 are adjustably positioned with respect to rear guides 242 by means of screws 249 which pass through openings 250 in front guides 243 and guide spacers 244, through slot openings 251 in rear guides 242, and are threadedly received within openings 252 provided in a pair of clamping plates 253.

Front guides 243 are provided at the lower ends thereof with downwardly and rearwardly curved tab extensions 254. As illustrated in the drawings, tabs 254 act to engage the leads 102 of the tape components and guide the leads into the feed and cutter mechanisms 227, 228.

The feed and cutter mechanisms 227 and 228 include guide discs 255 and 256 which are provided with annularly spaced component lead receiving notches 257 and 258, respectively, and which are keyed for rotation with shaft 259; cutter blocks 260 and 261 which are loosely journalled on shaft 262; and cutter discs 263 and 264, which are keyed for rotation with shaft 262 and are rotatably received within slot openings 265 and 266 provided in blocks 260 and 261, respectively. As will be apparent from FIGS. 4 and 5, shafts 259 and 262 are rotatably supported by end plates 230 and 231, and suitable locking means 267 are provided to adjustably maintain guide discs 255, 256; cutter blocks 260, 261; and cutter discs 263, 264 in position with respect to each other and with respect to conveyor 20.

Cutter blocks 260, 261 are also provided with slot openings 268, 269 to rotatably receive guide discs 255, 256 respectively. Further, blocks 260, 261 are cut out as at 270, 271 to define tape exit guides; cut out as at 272, 273 to define trimmed component lead guides, and are cut out to define lead guide surfaces 274, 275 which are spaced from a line joining the bottoms of discs slots 257, 258 a distance slightly greater than the diameter of the component leads 102 to be cut. Thus, it will be seen that as the feed and cutter mechanism drive assembly 229 rotate shaft 259 in the direction indicated by arrow 276, component leads 102 are received within successively presented guide discs notches 257, 258; the guide surfaces 274, 275 acting to retain component leads 102 within notches 257, 258 as leads 102 are passed into engagement with cutter discs 263, 264. Also, it will be apparent that guide surfaces 274, 275 coact with notches 257, 258 to movably grip the leads 102 of the taped components, whereby the supply component tape 10 is removed from supply enclosure 8 and drawn downwardly through tape guide assembly 226.

The feed and cutter mechanism drive assembly 229 generally includes gears 277 and 278, which are journalled on a pin shaft 279 carried on end plate 230; a gear 280, which is keyed for rotation with shaft 259 and disposed in driven engagement with gear 278; a spring clip stop 281 which is carried on a collar 282 affixed for rotation with shaft 283; and a corrugated annular sheet spring 284, which is journalled on pin shaft 279 and disposed between gear 277 and end plate 230.

As generally shown in FIGS. 5 and 6, spring 284 is employed to positively force gear teeth 285 of gear 277 into driving engagement with gear teeth 286 of gear 278 when dispenser drive gear 17 which is removably placed in engagement with gear 277, is rotated in the direction indicated by arrow 436 shown in FIGS. 3 and 7. Thus it will be apparent that upon rotation of drive gear 17 in the direction indicated by arrow 436, the guide discs 255, 256 are driven in the direction indicated by arrow 276 by drive gear 17 acting through gears 277, 278, 280 and shaft 259. When drive gear 17 is counter-rotated to its original position by gear rack 429, spring 284 is adapted to be deformed to permit gear teeth 285 to slide with respect to gear teeth 286; counter rotation of gear 278 and thus the disc guides 255, 256 being prevented by means of spring clip stop 281.

As will be seen in FIGS. 5, 6, and 10, spring clip stop 281 is positively forced into engagement with the teeth of gear 278 by means of a coil spring 287 having its ends connected, respectively, to a pin 288 carried on shaft 283 and a pin 289 carried on end plate 231. One end of shaft 283 projects outwardly through end plate 231 as at 290 to provide a convenient gripping surface to permit manual rotation of shaft 283 to disengage the spring stop 281 from gear 278. This permits manual rotation of projecting end 291 of shaft 259 to enable components to be cleared from the component lead feed and cutter mechanisms 227, 228.

A generally U-shaped member 292 is journalled on shaft 283 and positioned axially thereof by collars 282 and 293. The legs of U-shaped member 292 are received within the recessed portion 293, defined by gear teeth 285 and 286 and functions to maintain spring clip stop 281 aligned with gear 278.

If desired a pair of annular guide flanges 294 may be adjustably affixed to shaft 259, and employed to restrain body portion 101 of components 100 from motion transversely of conveyor 20 during the lead cutting operation.

From the foregoing it will be apparent that the overall operation of dispenser 201 is as follows. Upon rotation of drive gear 17 in the direction of arrow 436, guide discs 255, 256 are driven in the direction of arrow 276 through the gear train including gear 277, gear teeth 285, 286, gear 278, and gear 280; the spring stop 281 being progressively stepped with respect to gear 278 against the bias of spring 287. When so driven, guide discs 255, 256 draw component supply tape 10 downwardly through tape supply assembly 226 and force leads 102 of components 100 into cutting engagement with cutter discs 263, 264. Upon continued rotation of guide discs 255, 256, as indicated in FIGS. 3 and 12, the severed ends of component leads 102, indicated as 102', which are affixed to tapes 10', are guided away from conveyor 20 by cutter block guide slots 270, 271, and the severed components 100 fall under the force of gravity through cutter block slots 272, 273 in to conveyor slots 26 sequenced into position therebeneath.

When drive gear 17 is counter rotated to its starting position, spring stop 281 prevents counter rotation of gear 278; motion between gears 277 and 278 being permitted by deformable spring 284.

TAPING MECHANISM

Referring generally to FIGS. 1 and 14, it will be seen that taping mechanism 300 is disposed adjacent the end of conveyor 20 and is adapted to remove from conveyor 20 and apply pairs of tapes 301, 302 to sequenced components 100. Tapes 301, 302 preferably having pressure sensitive adhesive applied to the surface thereof which is to be brought into engagement with leads 102 of components 100.

Taping mechanism 300 includes a taping head, generally indicated as 303; pressure roller, generally indicated as 304; component lead guide 305; a pair of endless elastic belts 306; a pair of tape supply reels 307, 308, a separator web supply reel 309; and a powered wind-up reel 310. Suitable rollers 311 are provided to guide tapes 301, 302 between supply reels 307, 308 and taping head 303, and wheels 312, 313 are provided to control tension in belts 306. Wheel 312 may be adjusted, by means, not shown, to vary the point at which belts 306 normally engage the surface of taping head 303.

It will be understood that the taping head 303 and pressure roller 304 are driven, as indicated by arrows 303', and 304', respectively, by taping mechanism drive 413 or drive acting 513 through clutch 541 to draw tapes from supply reels 307, 308 and drive belts 306. If desired the speed of taping head 303 may be varied from that of conveyor 20 to control the spacing between the components as taped. Also, wind-up reel 310 is driven in the direction indicated by arrow 310', by any suitable means, such as electric motor 314, to wind-up the taped component groups, i.e. A, C, D, B, C, and to withdraw a tape separating web 315 from reel 309. Separating web 315 functions to separate the convolutions of the taped components when on reel 310 to prevent frictional contact and interlocking between the components of adjacent convolutions. Motor 314 is suitably connected to reel 310, by means not shown, to permit the taped components to be wound on reel 310 at constant speed. Also, suitable means, not shown, may be provided to deenergize motor 314 when either machine is not in operation or clutch 541 is disengaged.

Referring particularly to FIGS. 14 and 16 it will be seen that taping head 303 includes six spaced apart annular ring elements 316–321 which are affixed for rotation with head drive shaft 322. Each of the ring elements is provided with equally spaced slots 323, the slots of each ring element being aligned axially of drive shaft 322. Slots 323 function to support and maintain the relative positioning of the leads 102 of components 100 during the taping operation, as shown particularly in FIG. 15.

Referring particularly to FIG. 16, there is shown recessed annular rings 324, 325 which are disposed between ring elements 316, 317 and 320, 321 respectively, which function to support tapes 301 in component receiving position on taping head 303. A second pair of recessed ring portions 326, 326, disposed between ring elements 317, 318 and 319, 320, respectively, serve to support and guide belts 306 when engaged with taping head 303, as shown generally in FIG. 15. It will be understood that the depth of slots 323 is sufficient to permit the leads 102 of components 100 to be firmly biased by belts 306 into surface contact with tapes 301, received on recessed ring portions 324, 325, when belts 306 engage taping head 303 as shown in FIG. 15.

As indicated in FIG. 16, ring elements 318 and 319 are axially spaced, as at 328, to receive component lead guide 305. Lead guide 305 is of inverted U-shaped construction and is adjustably mounted at a point above conveyor 20 to mounting plate 7 by means of a bracket 329 and threaded bolt 330. As shown in FIGS. 15 and 16, the legs of guide 305 extend downwardly and terminate at a point immediately adjacent the ends of body 101 and above the leads 102 of the components 100 when the components are carried in conveyor slots 26, and extend slightly forward of the axis of taping head shaft 322.

Lead guide 305 functions, as shown in FIG. 15, to positively retain leads 102 within conveyor slots 26, as the conveyor 20 is moved in the direction of arrow 25; the belts 306 being progressively deformed or forced out of engagement with taping head 303 by the thus retained leads. It will be apparent that as conveyor slots 26 move beyond the end 331 of lead guide 305, the elastic energy stored during deformation of belts 306', as shown in phantom, acts to throw or force the leads 102 of component 100 upwardly into surface engagement with tapes 301; the slots 323 acting to guide the component leads 102 into engagement with tapes 301 and to insure positive positioning between components. Preferably, wheel 312 is adjusted so that the leads of only one component at a time act to deform belts 306. By this construction, belts 306 not only act to remove components 100 from conveyor 20, but to positively bond or adhere leads 102 to tapes 301. This latter feature permits a single pair of tapes to be employed in packaging components 100.

Pressure roller 304, as indicated in FIG. 14, includes a pair of end plates 332 having serrated annular rims 333 which are adapted to engage and insure positioning of component leads 102 during and immediately after application of tapes 302 to the components. Axially between plates 332 there is provided a pair of annular bands 334 formed of resilient material. Annular bands 334 form deformable pressure surfaces which function to force tapes 302 into surface contact with tapes 301 and into enveloping engagement with component leads 102. The portion 335 of roller 304 between bands 334 is recessed to receive component bodies 101 and to receive belts 306, as indicated in FIG. 15.

To facilitate threading of tapes 301, 302 through the taping mechanism taping head 303 may be provided with hand wheel 336.

While only one type of component dispenser has been specifically described, it will be appreciated that dispensers of other construction may be substituted for or employed in combination with the disclosed dispenser in the practice of the present invention. Alternative dispensers would include gravity feed pre-loaded magazine or pneumatic conveyor dispensers having desired escape mechanisms for depositing upon the conveyor individual components which may have their leads pretrimmed to a desired length.

Further, it will be apparent that the second embodiment of the present invention may be modified by substituting for the mechanical memory unit disclosed a punched paper tape or magnetic memory tape, disc, or drum unit. Also, each embodiment of the present invention may be modified by employing pneumatic or magnetic relays to actuate the individual component dispensers. Other modifications of our machine, but within the scope of the present invention, will in view of the present disclosure become obvious to one having skill in the art, and thus wish to be limited only by the scope of the appended claims, wherein;

What is claimed is:

1. A machine for sequencing and taping electrical components characterized by having a body portion and at least one lead extending from each end of said body portion, which comprises in combination: a conveyor; a group of at least two component dispensers, dispensers of said group being disposed at spaced points along the path of travel of said conveyor; means for actuating said group of dispensers; a taping mechanism adapted to apply tape to components deposited on said conveyor by said disspensers; and means to control operation of said actuating means, said conveyor and said taping mechanism, said control means acting to sequentially stop and start both said conveyor and said taping mechanism, and said control means acting to operate said actuating means to cause said dispensers in said group to simultaneously deposit components on said conveyor to form a predetermined group of components each time said conveyor and said taping mechanism are stopped.

2. The component sequencing and taping machine of claim 1 wherein said dispenser actuating means includes a dispenser drive means provided one for each of said dispensers, and said control means includes a reciprocating member operably engaged with each of said drive means, and means to reciprocate said member once each time said conveyor and said taping mechanism is stopped.

3. The component sequencing and taping machine of claim 2 wherein said control means includes switch means, said switch means being responsive to the motion of said reciprocating member to indicate that the dispenser drive means have been operated.

4. The component sequencing and taping machine of claim 1 wherein said control means includes counter means, said counter means being responsive to the travel of said conveyor, whereby travel of said conveyor between stops is sufficient to remove a group of components deposited by said dispensers on said conveyor from beneath said group of dispensers.

5. The component sequencing and taping machine of claim 1 wherein said control means includes in combination: a source of power; clutch means adapted to selectively connect said conveyor and said taping mechanism to said source; and counter means, said counter means being responsive to the travel of said conveyor and adapted to control operation of said clutch, whereby said conveyor and said taping mechanism are disconnected from said source when the travel of said conveyor is sufficient to remove a group of components deposited by said dispensers on said conveyor from beneath said group of dispensers.

6. The component sequencing and taping machine of claim 5 wherein said control means additionally includes a selector drive assembly interposed between said clutch and said conveyor and said taping mechanism, said drive assembly being adapted to simultaneously or individually connect said conveyor and said taping mechanism with said clutch.

7. The component sequencing and taping machine of claim 6, wherein said clutch includes a first clutch part operably connected with said source of power and a second clutch part operably connected with said drive assembly, and means are provided to positively place said second clutch part in a prescribed rotational position each time said clutch is disconnected.

8. The component sequencing and taping machine of claim 5 wherein said clutch includes a first clutch part operably connected with said source of power and a second clutch part operably connected with said conveyor and said taping mechanism, and said control means includes conveyor travel indicating means operably connected with said second clutch part, said counter means being responsive to said indicator means when said conveyor and said taping mechanism is connected to said source of power.

9. A machine for sequencing and taping electrical components characterized by having a body portion and at least one lead extending from each end of said body portion, which comprises in combination: a conveyor; a group of dispensers, dispensers of said group being disposed at spaced points along the path of travel of said conveyor; means for actuating said dispensers; a taping mechanism adapted to apply tape to components deposited on said conveyor by said dispensers, said conveyor and said taping mechanism being adapted to run continuously; and control means, said control means including memory means adapted to control operation of said actuating means such that said dispensers of said group are actuated in a sequence determined by said memory means to deposit components on said conveyor to form successive predetermined groups of components to be taped.

10. The component sequencing and taping machine of claim 9, wherein said dispenser actuating means includes a dispenser drive means provided one for each of said dispensers, said conveyor is provided with separate means spaced in the direction of conveyor travel to receive and position components deposited by said dispensers, and said memory means includes at least two memory elements, said memory elements and said conveyor component positioning means being adapted to be moved at the same linear speed past said dispensers and said dispenser drive means, and said memory elements being adapted to control operation of said dispenser drive means whereby said dispensers are actuated in a sequence determined by said memory elements to deposit components on the component positioning means of said conveyor in successive predetermined groups.

11. A machine for sequencing and taping electrical components characterized by having a body portion and at least one lead extending axially from each end of said body portion, which comprises in combination: a conveyor; a group of component dispensers, dispensers of said group being disposed at spaced points along the path of travel of said conveyor; means for actuating said dispensers; a taping mechanism adapted to apply tape to components deposited on said conveyor by said dispensers; and means to control operation of said actuating means such that components are deposited on said conveyor in successive predetermined groups, said conveyor being provided with a series of spaced pairs of opposed slots, said slots being adapted to receive the axially extending leads of said components when said leads are disposed transversely of the path of travel of said conveyor, and said taping mechanism comprises in combination a taping head, said head being disposed above and transversely of said conveyor, a pair of endless elastic belts, said belts being normally adapted to engage the surface of said taping head about a predetermined portion of the periphery thereof, and guide means, said guide means being adapted to retain the leads of said components within said slots as said components are conveyed beneath said taping head to thereby deform said elastic belts, said belts acting to force the leads of said components upwardly into engagement with said taping head when said conveyor slots are moved to a point past said guide means.

12. A taping mechanism for applying supporting tapes to the leads of electrical components presented to said taping mechanism, which comprises: a rotatable taping head adapted to present supporting tapes in a component lead receiving position, and movable resilient means adapted to propel leads of components presented to said mechanism into positive bonding engagement with said presented supporting tapes, said resilient means being adapted to be deformed and thereafter released to propel said component leads into bonding engagement with said presented tapes.

13. A taping mechanism according to claim 12 wherein said resilient means includes a pair of resilient tapes adapted to be normally engaged with the surface of said taping head about a portion of the periphery thereof, and there is additionally provided presented component guide means, said guide means acting to deform said belts to partially remove said belts from engagement with said taping head and to thereafter release said belts each time a component is presented to said taping mechanism.

14. A machine for forming successive sequenced groups of electrical components characterized by having a body portion and at least one lead extending axially from each end of said body portion, which comprises: a conveyor; means to drive said conveyor; a plurality of dispenser stations disposed at relatively spaced points along the path of travel of said conveyor, each of said stations having a separate dispenser actuator; at least two component dispensers, each of said dispensers being removably mounted at a different dispenser station and adapted to be actuated by said dispenser actuator provided at such station, at least one of said dispensers including a pair of lead feeding and cutter mechanisms spaced relatively apart to receive the respective axial leads of components to be deposited and including means adapted to be removably connected to said dispenser actuator to effect operation of said feeding and cutter mechanisms only when said actuator is rotatably driven in a first direction, each of said mechanisms including a component lead guide disc, a cutter block and a cutter disc, said guide discs of each said mechanisms being adapted to be rotatably driven simultaneously by said connecting means to feed said component leads past said cutter discs to effect trimming of said respective component leads, said cutter discs being adapted to be rotatably driven by frictional engagement with said component leads fed therepast by said guide discs, and said cutter blocks acting to maintain said respective component leads in feeding engagement with said guide discs during trimming of said leads and immediately thereafter acting to guide said trimmed leads away from said guide discs towards said conveyor; and means adapted to control operation of said dispenser actuators, whereby successive sequenced groups of components are deposited by said dispensers on said conveyor.

15. The machine according to claim 14 wherein said connecting means includes a pin shaft, a first gear mounted on said pin shaft which is adapted to be removably engaged with said dispenser actuator, a second gear mounted on said pin shaft, said second gear being operably connected to effect driving rotation of said guide discs, means for drivingly connecting said first and second gears for rotation in a guide disc driving direction, means to lock said second gear against rotation opposite to said guide disc driving direction, and resilient means to permit said first and second gears to be drivingly disconnected when said first gear is driven in a direction opposite to said guide disc driving direction.

16. A machine for forming successive sequenced groups of electrical components, which comprises: a conveyor provided with component receiving means spaced apart in the direction of the path of travel thereof; means to drive said conveyor; a plurality of dispenser stations disposed at relatively spaced points along said path of conveyor travel, each of said stations having a separate dispenser actuator including an actuator shaft and a driven gear adapted to rotate said shaft in an actuator driving direction, said actuator shafts being parallel and relatively spaced apart in the direction of said path of conveyor travel; at least two component dispensers, each of said dispensers being mounted at a different dispenser station and adapted to be actuated by said actuator shaft provided at such station, at least the drive gears of said actuators connected to said two dispensers being relatively spaced axially of their respective actuator shafts; and means adapted to control operation of said dispenser actuators, said control means including a mechanical memory unit, said unit including a plurality of memory elements, said memory elements being adapted to be conveyed past said actuator gears at the same linear speed said conveyor component receiving means are conveyed past said dispensers, and at least two adjacent memory elements having means adjustably positioned to engage said actuator gears, whereby said dispensers are actuated in a predetermined sequence and said dispensers are caused to deposit in said conveyor component receiving means successive groups of sequenced components.

17. A machine for forming successive sequenced groups of electrical components which comprises a conveyor; means to drive said conveyor; a plurality of dispenser stations disposed at relatively spaced points along the path of travel of said conveyor, each of said stations having a separate dispenser actuator; at least two component dispensers, each of said dispensers being mounted at a different dispenser station and adapted to be actuated by said dispenser actuator provided at such station; and means adapted to control operation of said dispenser actuators, said control means including a mechanical memory unit, said unit including a plurality of spaced memory elements, said elements being adjustable to sequentially control operation of said dispenser actuators, whereby successive groups of electrical components are deposited on said conveyor.

18. An electrical component sequencing and taping machine having in combination: a conveyor; a group of at least two component dispensers, dispensers of said group being disposed at spaced points along the path of travel of said conveyor; means for actuating said group of dispensers; means to control operation of said actuating means in a predetermined manner; and a taping mechanism adapted to remove deposited components from said conveyor and adapted to apply supporting tapes to said components, said taping mechanism including a rotatable taping head adapted to present supporting tapes in a component receiving position, and means adapted to successively remove said deposited components from said conveyor and to propel said components into bonding engagement with said presented supporting tapes.

19. An electronic component sequencing and taping machine having in combination: a conveyor; a group of at least two component dispensers, dispensers of said group being disposed at spaced points along the path of travel of said conevyor; means for actuating said group of dispensers; a taping mechanism adapted to apply tape to components deposited on said conveyor by said dispensers; drive means adapted to power said conveyor and said taping mechanisms; means to disconnect said taping mechanism from said drive means; and memory means to control operation of said actuating means, said memory means being selectively adjustable to periodically disconnect said taping mechanism from said drive means, whereby components are deposited on said conveyor in successive predetermined groups and said groups of components are taped by said taping mechanism with a predetermined spacing between adjacent taped groups.

20. A machine according to claim 9, wherein the spacing between individual components in each of said predetermined groups is equal, and said memory means is operable to control operation of said actuating means such that the spacing between said successive groups is greater than said component spacing in each said group.

References Cited

UNITED STATES PATENTS

| | | | |
|---|---|---|---|
| 2,771,206 | 11/1956 | Daniels et al. | |
| 2,854,054 | 9/1958 | Gross | 221—71 X |
| 2,868,413 | 1/1959 | Vossen | 221—9 |
| 2,885,849 | 5/1959 | Wohlman | 53—198 |

TRAVIS S. McGEHEE, *Primary Examiner.*

U.S. Cl. X.R.

53—198, 200; 156—522, 552; 221—9, 30; 74—2; 83—495